US008499792B2

(12) United States Patent
Lee

(10) Patent No.: US 8,499,792 B2
(45) Date of Patent: Aug. 6, 2013

(54) ACTIVATABLE NANOPARTICLE COMPOSITE VALVE

(75) Inventor: Kwangyeol Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 574 days.

(21) Appl. No.: 12/540,875

(22) Filed: Aug. 13, 2009

(65) Prior Publication Data

US 2011/0036431 A1 Feb. 17, 2011

(51) Int. Cl.
*F15C 1/04* (2006.01)
(52) U.S. Cl.
USPC .......................................................... 137/828
(58) Field of Classification Search
USPC .................................................. 137/79, 828
See application file for complete search history.

(56) References Cited

U.S. PATENT DOCUMENTS

| | | | | |
|---|---|---|---|---|
| 5,705,813 | A * | 1/1998 | Apffel et al. | 250/288 |
| 6,048,734 | A * | 4/2000 | Burns et al. | 436/180 |
| 6,299,907 | B1 | 10/2001 | Seib et al. | |
| 6,428,811 | B1 * | 8/2002 | West et al. | 424/497 |
| 2003/0156953 | A1 | 8/2003 | Chinn et al. | |
| 2003/0156991 | A1 * | 8/2003 | Halas et al. | 422/100 |
| 2007/0196281 | A1 * | 8/2007 | Jin et al. | 424/9.34 |
| 2008/0142501 | A1 | 6/2008 | Morioka et al. | |
| 2008/0227664 | A1 | 9/2008 | Honma et al. | |
| 2008/0241262 | A1 | 10/2008 | Lee et al. | |
| 2009/0258073 | A1 * | 10/2009 | Tishin et al. | 424/489 |
| 2011/0136222 | A1 | 6/2011 | Fujimoto | |

FOREIGN PATENT DOCUMENTS

| | | |
|---|---|---|
| JP | 200729249 | 9/2007 |
| JP | 2007229249 A * | 9/2007 |
| WO | WO 2005092286 A2 * | 10/2005 |

OTHER PUBLICATIONS http://www.merriam-webster.com/dictionary/dispersed, Aug. 2012.*
Noritake Col, Limited "Ceramic Heater: Far-infrared Ceramic Heater" Online: http://www.noritake.co.jp/eng/eeg/heat/product/ensekigaisen/pdf/ceramicheat.pdf.
Yoshihito Osada, et al "Spontaneous Motion of Amphoteric Polymer Gels on Water" Jpn. J. Appl. Phys. vol. 34 (1995) pp. L511-L512, Part 2, No. 4B, Apr. 15, 1995.
Kazutoshi Haraguchi, et al "Effects of Clay Content on the Properties of Nanocomposite Hydrogels Composed of Poly(N-isopropylarcrylamide) and Clay" Marcomolecules 2002, 35, 10162-10171.
Y. Nagata, et al "Soft Actuators", NTS (2004).
Y. Furuya, et al "Next-Generation Actuator Materials and Devices" CMC Press (2006) Chapter 7.
Y. Nakano "Functions of Polymer Gels" CMC Press (1999) 62-64.
Hiroyuki Sasase, et al "Regulation of temperature-response swelling behavior of interpenetrating polymer networks composed of hydrogen bonding polymers" Makromol. Chem., Rapid Commun. 13, (1992) 577-581.

(Continued)

*Primary Examiner* — Craig Schneider
*Assistant Examiner* — R. K. Arundale
(74) *Attorney, Agent, or Firm* — Workman Nydegger

(57) ABSTRACT

Compositions, systems and methods for using a nanoparticle composite to act as a valve within a microfluidic conduit to regulate fluid flow therethrough are provided. The nanoparticle composite includes a core having magnetic particles and Au particles and includes a hydrogel coating surrounding the core. The size of the nanoparticle composite is controlled by causing the hydrogel coating to lose water or absorb water, thus decreasing or increasing the size of the nanoparticle composite within the microfluidic conduit.

22 Claims, 4 Drawing Sheets

OTHER PUBLICATIONS

Ryo Yoshida, et al "Drug Release Profiles in the Shrinking Process of Thermoresponsive Poly(N-isopropylacrylamide-co-alkyl methacrylate) Gels" Ing. Eng. Chem. Res. 1992, 31, 2339-2345.

Yoshiharu Hirose "The Response of Ionic Gels Upon Electric Fields" Online [http://www.tytlabs.co.jp/japanese/review/rev272pdf/272_001_hirose.pdf] vol. 27, No. 2 (1992.6).

Rama Venkatasubramanian, et al "Thin-film thermoelectric devices with high room-temperature figures of merit" Nature, vol. 413, Oct. 11, 2001 pp. 597-602.

Karl Kratz, et al "Structural changes in PNIPAM microgel particles as seen by SANS, DLS and EM techniques" Polymer, 42, (2001), 6631-6639.

Robert Pelton "Temperature-sensitive aqueous microgels" Advances in Colloid and Interface Science, 85, (2000) 1-33.

Noritake Col, Limited "Ceramic Heater: Far-infrared Ceramic Heater" Online: http://www.noritake.co.jp/eng/eeg/heat/product/ensekigaisen/pdf/ceramicheat.pdf; available at least as of Aug. 2, 2009.

U.S. Appl. No. 12/631,623, Dec. 8, 2011, Office Action.

Jun-Hyun Kim, et al "Thermo-Responsive Hydrogel-Coated Gold Nanoshells" Intl. Conf. on Biomedical and Pharmaceutical Engineering 2006 (ICBPE 2006), Dec. 11-14, 2006 pp. 271-275.

Jun-Hyun Kim, et al "Thermo-Responsive Hydrogel-Coated Gold Nanoshells for in Vivo Drug Delivery' Journal of Biomedical & Pharmaceutical Engineering 2:1 (2008) pp. 29-35.

Mathias Brust, et al "Synthesis of Thiol-derivatised Gold Nanoparticles in a Two-phase Liquid-Liquid System" J. Chem. Soc., Chem. Commun., 1994 pp. 801-802.

Xiuli Zhao, et al "Thermoswitchable Electronic Properties of a Gold Nanoparticle/Hydrogel Composite" Macromolecular Rapid Communications, 2005, 26, pp. 1784-1784.

Xiuli Zhao, et al "A kind of smart gold nanoparticle-hydrogel composite with tunable thermo-switchable electrical properties" New Journal of Chemistry, 2006, 30, pp. 915-920.

Jun-Hyun Kim, et al "Discrete Thermally Responsive Hydrogel-coated Gold Nanoparticles for Use as Drug-delivery Vehicles"Drug Development Research, Special Issue: Nanobiotechnology, vol. 67, Issue 1, pp. 61-69, Jan. 2006.

Reynolds A. Frimpong, et al "Synthesis and Temperature Response Analysis of Magnetic-Hydrogel Nanocomposites" Journal of Biomedical Materials Research Part A, vol. 80A, Issue 1, pp. 1-6, Jan. 2007.

Australian Patent Office; International Search Report and Written Opinion in related PCT application No. PCT/KR2010/005216; mailed Oct. 28, 2010.

U.S. Appl. No. 12/631,623, Jan. 20, 2012, Office Action.

U.S. Appl. No. 12/631,623, Aug. 27, 2012, Office Action.

Lavine, B.K., et al., "Swellable molecularly imprinted polyN-(N-propyl)acrylamide particles for detection of emerging organic contaminants using surface plasmon resonance spectroscopy", Talanta., vol. 72, Issue 3, pp. 1042-1048 (2007).

U.S. Appl. No. 12/631,623, Mailed Aug. 27, 2012, Office Action.

U.S. Appl. No. 12/631,623, Mailed Mar. 22, 2013, Notice of Allowance.

* cited by examiner

Front View

Front View

Top View

Side View

Front View

ACTIVATABLE NANOPARTICLE COMPOSITE VALVE

TECHNICAL FIELD

Embodiments described herein relate to activatable nanoparticle composites that can perform valve functions within microfluidic conduit systems. More particularly, the nanoparticle composites are placed within microfluidic conduits to effectively open or close the conduit without causing any damage to the system and/or microfluidic conduit.

BACKGROUND

In systems having microfluidic conduits, it is difficult to mechanically open or close a microfluidic conduit without requiring extensive modifications to the system or damaging the microfluidic conduit in the process. Thus, the inability to effectively open or close such a narrow conduit without causing damage has made it difficult to control fluid flow in such systems, especially as dimensions become smaller.

DETAILED DESCRIPTION

Figure 1A:
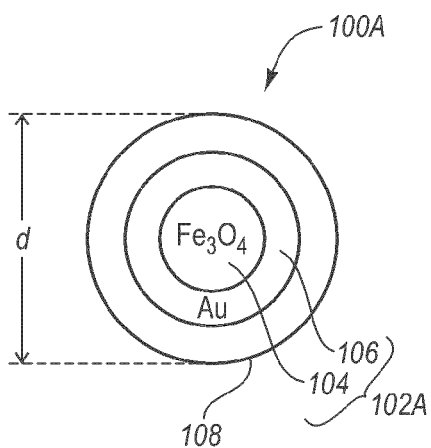
FIGS. 1A through 1D show schematics of illustrative embodiments of nanoparticle composites.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments are directed to activatable nanoparticle composites that can perform valve functions within a microfluidic conduit system. Thus, microfluidic conduits of can be effectively opened or closed without causing damage to the system and/or microfluidic conduit.

Embodiments are broadly directed to systems having one or more microfluidic conduits. In some embodiments, the microfluidic conduits have a diameter of about 1,000 nm or less. In some embodiments, the microfluidic conduits have a diameter of about 500 nm to about 1,000 nm. In yet other embodiments, the microfluidic conduits have a diameter of about 150 nm to about 500 nm. However, embodiments can also include systems having microfluidic conduits of larger diameter, such as about 5,000 nm (5 microns) to about 10,000 nm (10 microns). Thus, as used herein, the term "micro" in connection with microfluidic conduits should be broadly interpreted to refer to conduits being sized in the micro-sized and/or nano-sized region. One or more nanoparticle composites can be placed within a microfluidic conduit. Thus, the term "nano" in connection with nanoparticle composites should be broadly interpreted to refer to particles being sized in the micro-sized and/or nano-sized region. Nanoparticle composites will be described further below.

The system having one or more microfluidic conduits can be part of an organic structure (such as a human body) or an inorganic structure (such as a semi-conductor device, a porous ceramic object, and the like). The microfluidic conduits can exist in the system as a tube-like structure, such as a capillary (5 microns to 10 microns), or can be formed in a unitary structure, such as an etched channel in a semiconductor wafer, a pore formed in a ceramic structure, and the like. Thus, the microfluidic conduit can be completely encased or partially encased (such as a channel structure), but in either case, fluid flow would be desirable to be regulated in the microfluidic conduit. The nature of the microfluidic conduit is not essential, so long as it is understood that the teachings herein can be implemented in a variety of different systems to effect a valve-like operation. Thus, systems that incorporate microfluidic conduits can include micro-electro-mechanical systems (MEMS), biosystems, inorganic porous systems, and the like. In one embodiment, PDMS-based imprint methods (e.g., Polydimethylsiloxane (PDMS) lithography, nanolithography) can be used for fabricating the microfluidic conduits.

Some embodiments are directed to activatable nanoparticle composites that are placed in one or more microfluidic conduits to form a microfluidic valve system. Using properties of the nanoparticle composites, the nanoparticle composites can act as a valve, effectively opening and closing without causing damage to the system and/or microfluidic conduit.

Some embodiments include a nanoparticle composite for use in controlling a microfluidic valve system, with the nanoparticle composite having a core including magnetic particles and Au particles, and a hydrogel coating surrounding the core. The core can further include a dielectric portion, where the magnetic particles, Au particles, and/or dielectric portion can be synthesized into a variety of configurations. In some embodiments, the magnetic particles can be iron oxide ($Fe_2O_3$, $Fe_3O_4$,), superparamagnetic materials, ferromagnetic materials such as Co, Sm-containing alloys, FePt, and the like, or combinations thereof. In some embodiments, the dielectric portion can be $SiO_2$ or another polymer. A resting diameter of the combined core and hydrogel coating can be less than about 1,000 nm. In other embodiments, the resting diameter of the combined core and hydrogel coating can be about 1,000 nm (1 micron) to about 5,000 nm (5 microns). In yet other embodiments, the resting diameter of the combined core and hydrogel coating can be about 5,000 nm (5 microns) to about 10,000 nm (10 microns).

Some embodiments include a microfluidic valve system having a microfluidic conduit configured to increase fluid flow to pass therethrough. A nanoparticle composite is disposed in the microfluidic conduit, the nanoparticle composite having a core having magnetic particles and Au particles and having a hydrogel coating surrounding the core. In addition, an activating device can be disposed in operable communication with the nanoparticle composite and configured to activate the nanoparticle composite, such that when the Au particles become heated, the hydrogel coating loses water content, causing a diameter of the nanoparticle composite to decrease from a resting diameter that decreases the amount of fluid flow allowed to pass through the microfluidic conduit to a reduced diameter that increases the amount of fluid flow through the microfluidic conduit. The nanoparticle composite can also be deactivated such that when the Au particles lose heat, the hydrogel coating absorbs water causing the reduced diameter to return to the resting diameter to decrease the fluid flow through the microfluidic conduit. Hence, the nanoparticle composite acts as a valve within the microfluidic conduit to regulate fluid flow through the microfluidic conduit.

The activating device can cause irradiation of the nanoparticle composite with a near infrared radiation having a wavelength of, for example, as about 700 nm to about 1400 nm, causing the hydrogel coating to lose water content. When the activating device discontinues irradiation of the nanoparticle composite of the near infrared radiation, the hydrogel coating absorbs water. The microfluidic conduit can be configured in various shapes. The nanoparticle composite can be placed at a predetermined location along a length of the microfluidic conduit. A magnetic source can be applied at the predetermined location to hold the nanoparticle composite in place. The microfluidic conduit can be formed in various types of structures, such as an organic, inorganic, MEMS system, and the like.

Yet other embodiments include a method for controlling a microfluidic valve system, the method including disposing a nanoparticle composite at a predetermined location of a microfluidic conduit, the nanoparticle composite having a core having magnetic particles and Au particles and having a hydrogel coating surrounding the core. The method also includes identifying fluid entering the microfluidic conduit, but where fluid flow is decreased from flowing through microfluidic conduit by the nanoparticle composite having a resting diameter that is substantially the same as a diameter of the microfluidic conduit at the predetermined location. The method also includes activating the nanoparticle composite to heat the Au particles to cause the hydrogel coating to lose water content causing the diameter of the nanoparticle composite to decrease from the resting diameter that decreases fluid flow in the microfluidic conduit to a reduced diameter that increases fluid flow through the microfluidic conduit. The method further includes deactivating the nanoparticle composite to cause the Au particles to lose heat such that the hydrogel coating absorbs water causing the reduced diameter to return to the resting diameter to decrease fluid flow through the microfluidic conduit. Hence, the nanoparticle composite acts as a valve within the microfluidic conduit to regulate fluid flow through the microfluidic conduit.

FIGS. 1A through 1D show schematics of illustrative embodiments of nanoparticle composites. The exact configuration of the nanoparticle composites is not essential so long as the diameter of the nanoparticle composite can be made to decrease and/or increase when activated and/or deactivated.

FIG. 1A shows a schematic of an illustrative embodiment of a nanoparticle composite 100A including a core 102A having magnetic particles 104 and Au particles 106, and a hydrogel coating 108 surrounding the core 102A. In FIG. 1A, the Au particles 106 are disposed in the form of a coating surrounding the magnetic particles 104. In other embodiments (not shown), the Au particles 106 may be disposed within the magnetic particles 104. The magnetic particles 104 can be any suitable magnetic material including, but not limited to, iron oxide ($Fe_2O_3$, $Fe_3O_4$,), superparamagnetic materials, ferromagnetic materials such as Co, Sm-containing alloys, FePt, and the like, or combinations thereof. The magnetic particles 104 can be used to affix the nanoparticle composite 100A in a fixed location within a microfluidic conduit by applying a magnetic source to the nanoparticle composite 100A. Examples of suitable magnetic sources (e.g., magnetic source 310 and magnetic source 416) are described hereinbelow in greater detail in reference to FIGS. 3A and 4B.

Referring to FIG. 1A, the Au particles 106 of the core 102A provide an activatable portion that may be used to activate and deactivate the nanoparticle composite 100A to cause the hydrogel coating 108 to lose and/or absorb water resulting in a decrease and/or increase of diameter, d, of the nanoparticle composite 100A.

Hydrogel polymers are useful materials in a variety of technological applications, including catalysis, drug delivery, and chemical separations. In aqueous solution, hydrogels undergo abrupt volume transitions that are correlated with the lower critical solution temperature (LCST) and other chemical or physical stimuli, such as pH, ionic strength, and/or solvent composition. Hydrogel polymers are typically hydrophilic and well dispersed in water below the LCST, but become hydrophobic above this temperature. Embodiments utilize the ability to manipulate the environment in which a hydrogel polymer can be placed in order to induce change of a nanoparticle composite's shape and/or size.

Figure 1B:
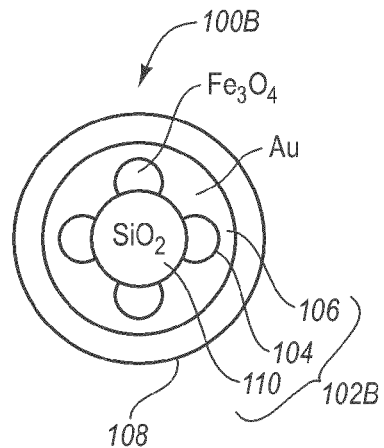

Turning to FIG. 1B, a schematic of another illustrative embodiment of a nanoparticle composite 100B is shown having a core 102B including a dielectric portion 110 having Au particles 106 and magnetic particles 104 formed thereon. Thus, the magnetic particles 104 are deposited outside the dielectric portion 110 in a dispersed manner and coated by the Au particles 106. In addition, the Au particles 106 partially contact the dielectric portion 110. The function of the dielectric portion is to localize surface plasmon resonance (SPR) experienced by the core 102B confined to the Au particles 106. In some embodiments, the dielectric portion 110 can be formed from any suitable inorganic or organic dielectric material including, but not limited to $SiO_2$, polyethylene glycol (PEG), poly(lactic acid) (PLA), poly(glutamic acid) (PGA), or other polymer, and the like. In some embodiments, the same material can perform both a magnetic function and a dielectric function. For example, in the embodiment of FIG. 1A, the iron oxide magnetic particles are both magnetic and dielectric.

Figure 1C:
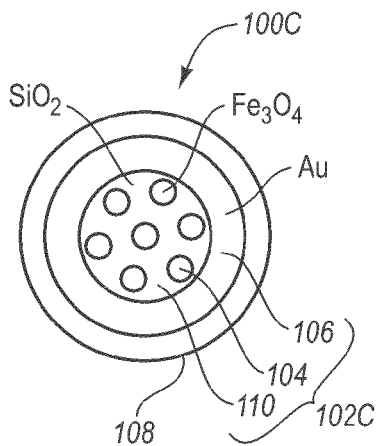

FIG. 1C shows a schematic of yet another illustrative embodiment of a nanoparticle composite 100C having a core 102C in which the magnetic particles 104 are disposed in the dielectric portion 110. The Au particles 106 are disposed as a coating surrounding the dielectric portion 110.

Figure 1D:
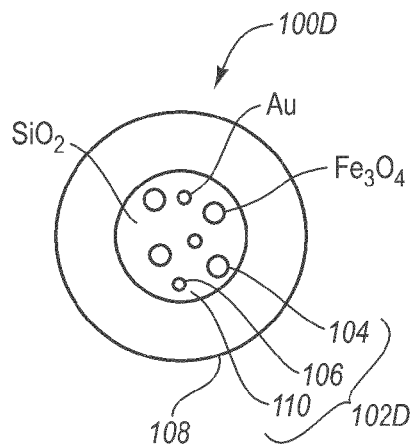

FIG. 1D shows a schematic of still another illustrative embodiment of a nanoparticle composite 100D having magnetic particles 104 and Au particles 106 dispersed within the dielectric portion 110.

FIGS. 1A through 1D show that the core of the nanoparticle composites may be constructed in various ways to provide a magnetic portion and an activatable portion.

The diameter, d, shown in FIG. 1A can vary depending on the particular microfluidic conduit system in which the nanoparticle composite is applied. The size of diameter, d, can depend on the size of the core 102 and/or the hydrogel coating 108. Because the core 102 and/or the hydrogel coating 108 can be synthesized at various thicknesses, the diameter, d, of the nanoparticle composite can accordingly be manufactured to have a particular size. A suitable diameter, d, can thus be on the order of about 1,000 nm or less. In some embodiments, the diameter, d, is about 500 nm to about 1,000 nm. In yet other embodiments, the diameter, d, is about 150 nm to about 500 nm. However, the diameter, d, can also be larger such as about 5,000 nm (5 microns) to about 10,000 nm (10 microns).

The core can be prepared using known formation techniques for generating magnetic particles, Au particles, and/or dielectric portions. In some embodiments, the core can be prepared using a seed-growth method, thermal decomposition of precursors such as iron acetylacetonate and iron oleate, thermal dehydration of iron hydroxides, co-precipitation, and the like. The hydrogel coating can be prepared using free radical polymerization to coat the core.

Figure 2:
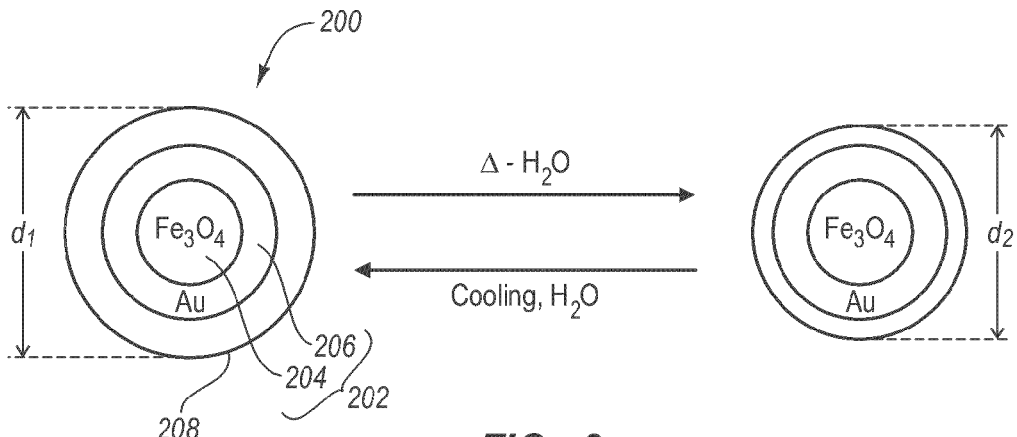
FIG. 2 shows a chemical principle of operation.

FIG. 2 shows a chemical principle of operation illustrating how a nanoparticle composite 200 can be activated and/or deactivated. The nanoparticle composite 200 includes a core 202 having magnetic particles 204 and Au particles 206, and a hydrogel coating 208 surrounding the core 202. On the left, the nanoparticle composite 200 is in a deactivated or resting state in which the composite has a resting diameter, $d_1$. The resting diameter, $d_1$, can be configured based on the size of the core 202 and/or the size of the hydrogel coating 208. In some embodiments, a volume of hydrogel coating 208 can be varied depending on the amount of water confined therein.

FIG. 2 also shows that the size of the nanoparticle composite 200 can be manipulated by heating the core 202. The hydrogel coating 208 releases the trapped water at higher temperature and reabsorbs water at lower temperature, and this process is reversible. Thus, the size of the nanoparticle composite 200 can be decreased from resting diameter, $d_1$, to reduced diameter, $d_2$, by heating the core 202. Similarly, the size of the nanoparticle composite 200 can return to resting diameter, $d_1$, by cooling the core 202.

Some embodiments use the characteristic that Au particles 206 are able to absorb light, resulting in heating of the Au particles. The size of the core can be specifically controlled during preparation to absorb particular wavelengths. In some embodiments, the Au particles 206 can be heated by applying near infrared (NIR) radiation having a wavelength of, for example, about 700 nm to about 1,400 nm. By juxtaposing the hydrogel coating 208 and the Au particles 206, when the Au particles 206 are heated with the NIR radiation, the heat released by the Au particles 206 causes the hydrogel coating 208 to lose water content. When the hydrogel coating 208 loses water, the size of the nanoparticle composite 200 shrinks, translating into a decrease in the diameter of the nanoparticle composite 200 to reduced diameter, $d_2$. In contrast, when the NIR radiation ceases, the Au particles 206 in turn decrease in temperature, returning to their resting temperature, which causes the hydrogel coating 208, in turn, to return to a resting temperature in which the hydrogel coating 208 absorbs water again. Cooling of the hydrogel coating 208 and absorption of water causes the size of nanoparticle composite 200 to return to resting diameter, $d_1$. The process of hydration and dehydration is completely reversible, allowing the nanoparticle composite to be activated/deactivated by switching the NIR radiation on/off.

Figure 3A:
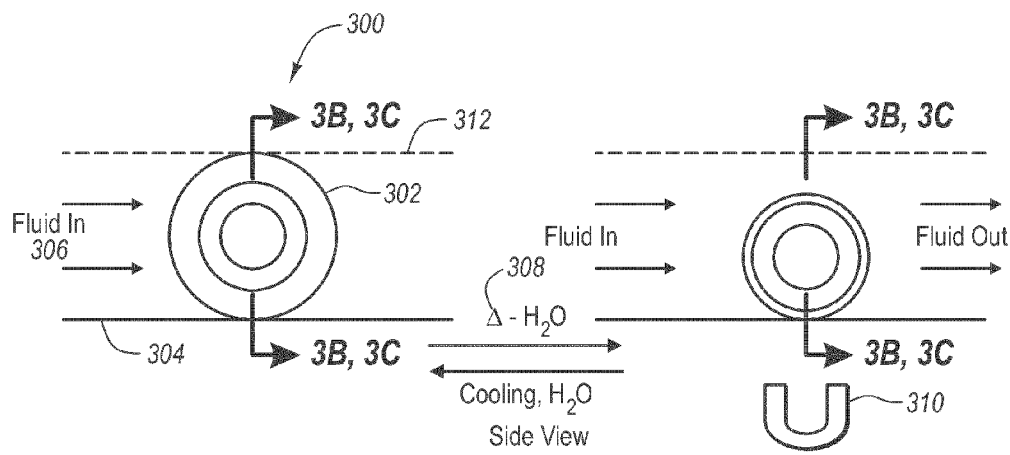
FIG. 3A shows a side view of an illustrative embodiment of a microfluidic valve system.

With this reversible on-and-off mechanism, it is possible to control the flow in a microfluidic conduit by activating/deactivating the nanoparticle composite. FIG. 3A shows a side view of an illustrative embodiment of a microfluidic valve system 300 having a nanoparticle composite 302 disposed in a microfluidic conduit 304. The microfluidic conduit 304 is configured to allow a fluid 306 to pass therethrough. The nanoparticle composite 302 can be any of the various configurations described herein, generally including at the least a core having magnetic particles and Au particles and having a hydrogel coating surrounding the core.

The microfluidic valve system 300 includes a mechanism to activate the nanoparticle composite 302 such that when the Au particles become heated, the hydrogel coating loses water content causing a diameter of the nanoparticle composite 302 to decrease from a resting diameter, $d_1$, that decreases fluid flow in the microfluidic conduit 304 to a reduced diameter, $d_2$, that increases fluid flow through the microfluidic conduit 304. The microfluidic valve system 300 also includes a mechanism to deactivate the nanoparticle composite 302 such that when the Au particles lose heat, the hydrogel coating absorbs water causing the reduced diameter, $d_2$, to return to the resting diameter, $d_1$, to decrease fluid flow through the microfluidic conduit 304. Accordingly, the nanoparticle composite 302 acts as a valve within the microfluidic conduit 304 to regulate fluid flow through the microfluidic conduit 304.

The mechanism to activate the nanoparticle composite 302 is shown as symbol "Δ" 308, to represent causing at least a portion of the nanoparticle composite 302 to heat, such that the hydrogel coating loses water content. In some embodiments, the mechanism 308 to activate the nanoparticle composite 302 includes an activating device that provides near infrared (NIR) radiation. In some embodiments, the NIR radiation has a wavelength of about 700 nm to about 1400 nm. In embodiments implementing NIR radiation, the mechanism to deactivate the nanoparticle composite 302 includes the ability to cease irradiation of the nanoparticle composite 302 with the activating device. As shown, when the nanoparticle composite 302 is activated, flow of the fluid 306 increases through the microfluidic conduit 304. When the nanoparticle composite 302 is deactivated, flow of the fluid 306 through the microfluidic conduit 304 decreases. When the activating device provides NIR radiation, the activating device can be operated slightly above physiological temperature, making a localized heating safe for human operation, as well as safe for any other bio-target to which the NIR radiation is being applied. The NIR radiation can also pass safely through tissue and water without adversely affecting the areas through which the NIR radiation passes.

FIG. 3A shows that the nanoparticle composite 302 may be placed in a predetermined location along a length of the microfluidic conduit 304. In some embodiments, where the microfluidic conduit 304 is substantially stationary, the nanoparticle composite 302 stays in place due to gravity and a sufficient friction with the inside surface of the microfluidic conduit 304. In another illustrative embodiment, shown in FIG. 3A, a magnetic source 310 can be disposed at the predetermined location to fix the nanoparticle composite 302 at the predetermined location.

Figure 3B:
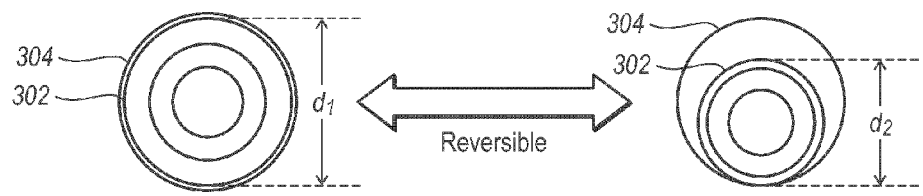
FIG. 3B shows a front view of an illustrative embodiment of a microfluidic valve system.
Figure 3C:
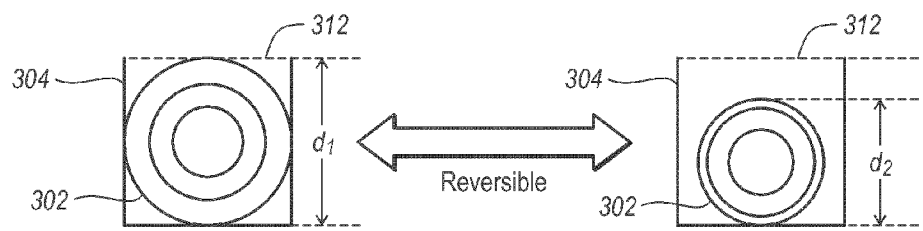
FIG. 3C shows a front view of another illustrative embodiment of a microfluidic valve system.

FIGS. 3A through 3C show various embodiments of microfluidic conduits. FIG. 3A shows a length of the microfluidic conduit 304. A dashed line 312 shows that the microfluidic conduit 304 may or may not be encased at the top thereof. In some embodiments, where the microfluidic conduit 304 is a capillary or other tube, the microfluidic conduit 304 is fully encased at the top thereof.

FIG. 3B shows a front view of an illustrative embodiment of a microfluidic valve system where the microfluidic conduit 304 is an encased tube-like structure having a circular cross-section. The nanoparticle composite 302 is placed in the tube-like structure to decrease fluid flow, or, alternatively, to increase fluid flow over the shrunken nanoparticle structure. FIG. 3C shows a front view of another illustrative embodiment of a microfluidic valve system where the conduit is a tube-like structure having a square cross-section.

However, the embodiments described herein could also apply where the top of the microfluidic conduit is open, such as in a channel structure, where it is desirable to decrease fluid flow. The dashed line 312 in FIG. 3A shows that the microfluidic conduit 304 may or may not be encased at the top of the conduit. FIG. 3C also shows dashed line 312 to illustrate that the microfluidic conduit 304 could be a channel as opposed to being fully encased as shown in FIG. 3B.

Figure 4A:
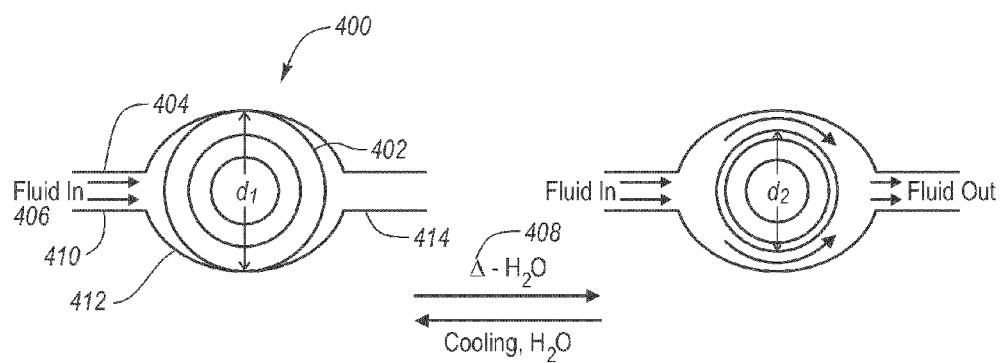
FIG. 4A shows a top view of an illustrative embodiment of a microfluidic valve system.

FIG. 4A shows a top view of an illustrative embodiment of a microfluidic valve system 400 having a nanoparticle composite 402 disposed in a microfluidic conduit 404. The microfluidic conduit 404 is configured to allow a fluid 406 to pass therethrough. The nanoparticle composite 402 can be any of the various configurations described herein, generally including at the least a core having magnetic particles and Au particles, and having a hydrogel coating surrounding the core. FIG. 4A differs from FIG. 3A in that the microfluidic conduit 404 includes an inlet portion 410, a valve seat 412 sized to hold the nanoparticle composite, and an outlet portion 414. In contrast, in FIGS. 3A through 3C, there are no such variations in the cross-section of the microfluidic conduit, at least immediately in the vicinity of the nanoparticle composite. The valve seat 412 has a larger diameter than the inlet portion 410 and the outlet portion 414. Thus, in this illustrative embodiment, the resting diameter, $d_1$, of the nanoparticle composite 402 is substantially the same as the diameter of the valve seat 412, but not the inlet portion 410 or the outlet portion 414. The mechanism to activate the nanoparticle composite 402 is shown as symbol "A" 408, to represent causing at least a portion of the nanoparticle composite 402 to heat, such that the hydrogel coating loses water content.

Figure 4B:
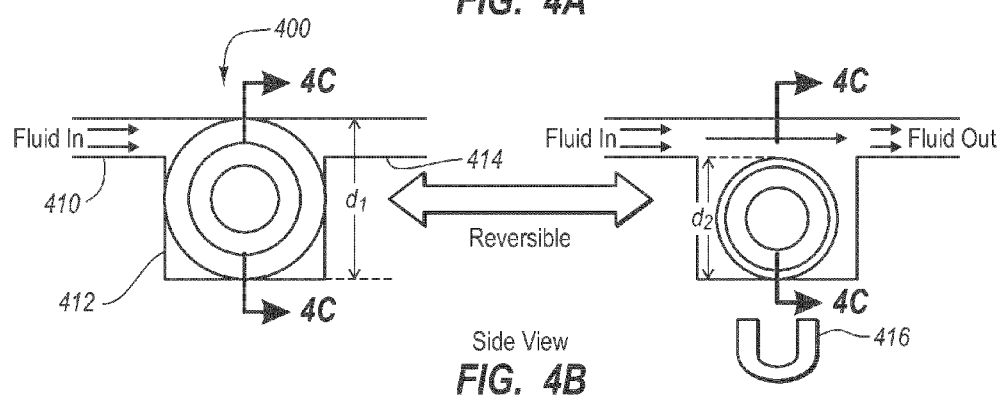
FIG. 4B shows a side view of an illustrative embodiment of a microfluidic valve system.

FIG. 4B shows a side view of an illustrative embodiment of the microfluidic valve system 400 having the inlet portion 410, the valve seat 412 and the outlet portion 414. When heated, the diameter of the nanoparticle composite 402 decreases from $d_1$ to $d_2$ to increase the fluid flow from the inlet portion 410, over the top of the valve seat 412 to the outlet portion 414. Again, a magnetic source 416 can be applied in some embodiments.

Figure 4C:
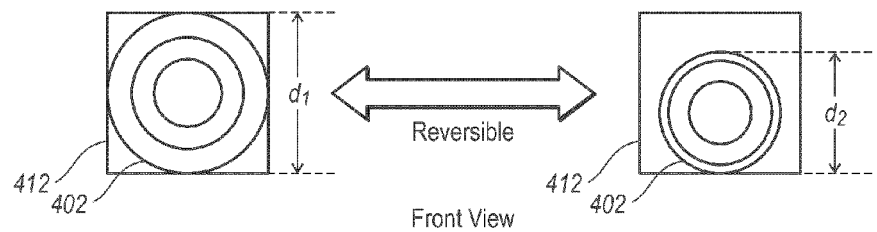
FIG. 4C shows a front view of an illustrative embodiment of a microfluidic valve system.

FIG. 4C shows a front view of an illustrative embodiment of a microfluidic valve system that functions similarly to the systems shown in FIGS. 4A and 4B. Because the nanoparticle composite 402 is placed within the valve seat 412, a cross section of the valve seat shown in FIG. 4C looks similar to the cross section shown in FIG. 3C. In one embodiment, the nanoparticle composite can be placed in the valve seat 412 by moving the nanoparticle composite along either the inlet portion 410 or the outlet portion 414 of the microfluidic channel in its reduced diameter state without fluid flowing through the microfluidic channel. For example, a magnetic force can be applied to the nanoparticle composite to compel the nanoparticle composite to be moved until it reaches the valve seat 412. Fluid is then introduced into the microfluidic channel through the inlet portion 410, which causes the nanoparticle composite to increase to its resting diameter. In this embodiment, one of skill in the art would recognize that the drawings may not be drawn to scale.

In another embodiment, one or more walls of the microfluidic conduit may be composed of an elastic material that can be deformed to allow the nanoparticle composite to be pushed and/or pulled through the microfluidic conduit to the valve seat. For example, the nanoparticle composite can be disposed in a needle, which is injected into the microfluidic conduit at the valve seat. The nanoparticle composite can be suspended in a carrier fluid so that it can be drawn in the needle and then injected into the valve seat. The exact manner of placing the nanoparticle composite at the desired location of the microfluidic conduit is not essential and other methods for placing the nanoparticle composite can be identified based on the teachings herein. Further, methods for placing the nanoparticle composite at the desired location of the microfluidic conduit can be used both for embodiments of microfluidic conduits having valve seats and those embodiments that do not have valve seats.

Placement of the nanoparticle composite can be confirmed using fluoroscopy or other visualizing technique. For example, the Au particles and magnetic particles are radiopaque metals that allow for detection using known fluoroscopy techniques. However, other visualizing techniques may be used, and a particular visualization technique is not essential to the invention.

Various configurations of microfluidic conduits can thus be used in conjunction with nanoparticle composites. The microfluidic conduits may be straight, curved, or have diameters of varying sizes along the length thereof. The nanoparticle composites can act as a valve in any of these configurations.

Figure 5:
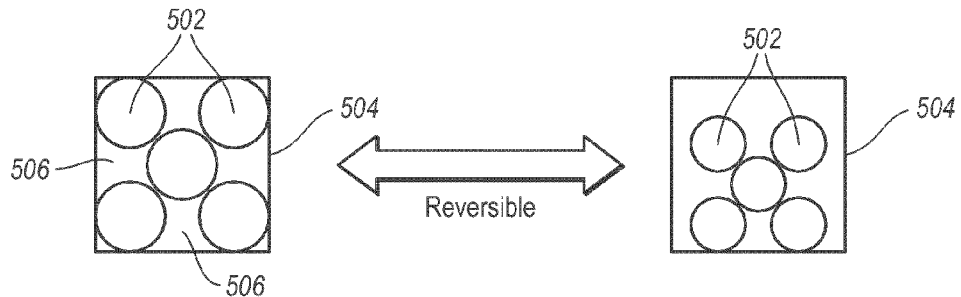
FIG. 5 shows a front view of an illustrative embodiment of a microfluidic valve system.

In some embodiments, while the nanoparticle composite is illustrated as a substantially spherical object, the hydrogel coating may be able to conform to the contours of the microfluidic conduit. Thus, it is possible for the nanoparticle composite to fill the microfluidic conduit cross-section to block fluid flow at the resting diameter of the nanoparticle composite to completely block fluid flow. In other embodiments, it is not necessary to block fluid blow, but rather to regulate fluid flow by increasing and/or decreasing fluid flow. In these embodiments, the hydrogel coating may not completely conform to the contours of the microfluidic conduit. Furthermore, FIG. 5 shows that multiple nanoparticle composites 502 may be placed in a microfluidic conduit 504, where in a resting state, gaps 506 are present between the nanoparticle composites 502, allowing a certain amount of fluid flow through the microfluidic conduit 504, even in the resting state. When activated, the nanoparticle composites 502 together decrease in size, thus increasing the amount of fluid flow in the microfluidic conduit 504.

Figure 6:
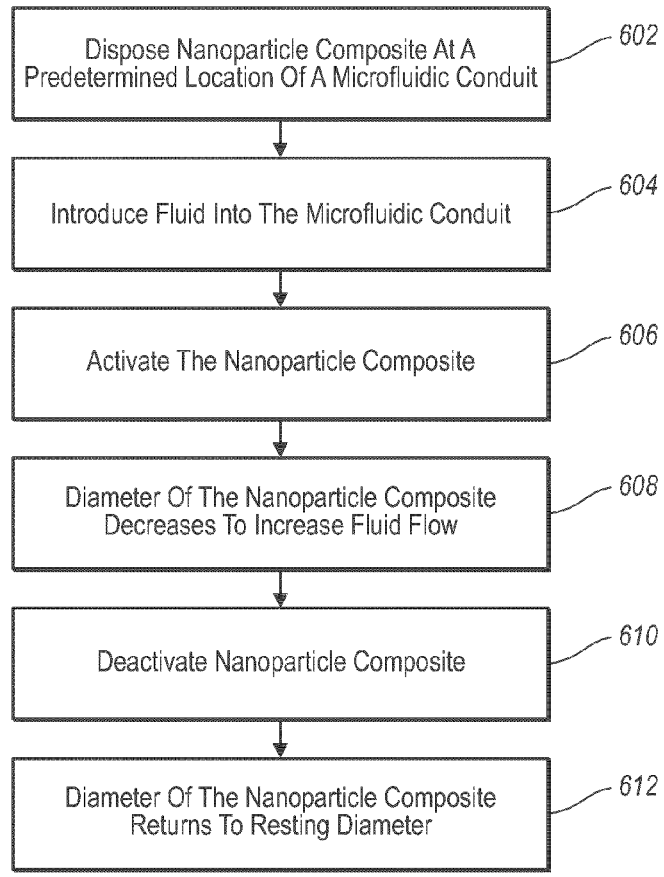
FIG. 6 shows a flow diagram of an illustrative embodiment of a method for operating a microfluidic valve system.

FIG. 6 shows a flow diagram of an illustrative embodiment of a method for operating a microfluidic valve system. In block 602, a nanoparticle composite is disposed at a predetermined location of a microfluidic conduit. The nanoparticle composite generally includes a core having magnetic particles and Au particles, and a hydrogel coating surrounding the core. In block 604, fluid is introduced into the microfluidic conduit, but fluid flow is decreased or restricted by the nanoparticle composite when a resting diameter of the nanoparticle composite is substantially the same as a diameter of the microfluidic conduit at the predetermined location. In block 606, the nanoparticle composite is activated to heat the Au particles to cause the hydrogel coating to lose water content. In block 608, as a result of the activation operation in block 606, the diameter of the nanoparticle composite decreases from the resting diameter that decreases fluid flow in the microfluidic conduit to a reduced diameter that increases fluid flow through the microfluidic conduit. When it is desirable to prohibit or restrict fluid flow, in block 610, the nanoparticle composite is deactivated to cause the Au particles to lose heat such that the hydrogel coating absorbs water. In block 612, as a result of the deactivation operation in block 610, the reduced diameter of the nanoparticle composite returns to the resting diameter to decrease fluid flow through the microfluidic conduit. Accordingly, the nanoparticle composite acts as a valve within the microfluidic conduit to regulate fluid flow through the microfluidic conduit.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Various techniques for activating and deactivating the nanoparticle composite are described above. In some embodiments, the method can include applying an activating device that irradiates the nanoparticle composite with near infrared radiation. Any suitable NIR irradiator unit can be used, such as those that are readily commercially available. The method can further include deactivating the nanoparticle composite by discontinuing irradiation of the near infrared wavelength. The method can further include applying a magnetic source at a predetermined location along the microfluidic conduit to hold the nanoparticle composite at the predetermined location.

The methods and systems can have broad application, particularly in bio-systems. The hydrogel coating of the nanoparticle composites are non-toxic, making them suitable for bio-systems. Further, the magnetic particles, Au particles, and dielectric portions are also generally biocompatible. When the activating device provides NIR radiation, the activating device can be operated slightly above physiological temperature, making a localized heating safe for human operation as well as safe for any other bio-target to which the NIR radiation is being applied. The NIR radiation can also pass safely through tissue and water without adversely affecting the areas through which the NIR radiation passes. The microfluidic valve systems can thus be used to perform biosensing functions, drug discovery, drug delivery (e.g., using the nanoparticle composite to open/close drug reservoir to release drug), on-chip bioseparation of biomaterials, and the like.

Furthermore, the microfluidic valve systems can serve as an automatic heat release system because the hydrogel reduces in size in the presence of higher temperature, placing the microfluidic valve system in an "on" position. This allows rapid flow through the microfluidic conduit at elevated temperature. The newly let-in colder fluid would lower the temperature in the microfluidic conduit system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly of the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g. "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A nanoparticle composite for use in controlling a microfluidic valve system, the nanoparticle composite comprising: a core comprising a plurality of particles including a plurality of magnetic particles and a plurality of Au particles, each of which includes an exterior surface and is dispersed within a dielectric such that the dielectric is dispersed between the exterior surface of each of the plurality of particles; and a hydrogel coating surrounding the core.

2. The nanoparticle composite of claim 1, wherein the magnetic particles comprise iron oxides, superparamagnetic materials, ferromagnetic materials, Sm alloys, FePt, or a combination thereof.

3. The nanoparticle composite of claim 1, wherein the dielectric portion comprises $SiO_2$, polyethylene glycol (PEG), poly(lactic acid) (PLA), poly(glutamic acid) (PGA), iron oxide, or a combination thereof.

4. The nanoparticle composite of claim 1, wherein a resting diameter
of combined core and hydrogel coating is less than about 1,000 nm.

5. The nanoparticle composite of claim 1, wherein a resting diameter
of combined core and hydrogel coating is about 150 nm to about 500 nm.

6. The nanoparticle composite of claim 1, wherein a resting diameter of combined core and hydrogel coating is about 500 nm to about 1,000 nm.

7. The nanoparticle composite of claim 1, wherein a resting diameter of combined core and hydrogel coating is about 1,000 nm to about 5,000 nm.

8. The nanoparticle composite of claim 1, wherein a resting diameter of combined core and hydrogel coating is about 5,000 nm to about 10,000 nm.

9. A microfluidic valve system comprising: a microfluidic conduit configured to allow fluid to pass therethrough; a nanoparticle composite disposed in the microfluidic conduit, the nanoparticle composite comprising a core having a plurality of particles, the plurality of particles including magnetic particles and Au particles, each of which includes an exterior surface and is dispersed within a dielectric such that the dielectric is dispersed between the exterior surface of each of the magnetic particles and each of the Au particles, and a hydrogel coating surrounding the core; and an activating device disposed in operable communication with the nanoparticle composite and configured to (1) activate the nanoparticle composite such that when the Au particles become heated, the hydrogel coating loses water content causing a diameter of the nanoparticle composite to decrease from a resting diameter that decreases fluid flow in the microfluidic conduit to a reduced diameter that increases fluid flow through the microfluidic conduit, and (2) deactivate the nanoparticle composite such that when the Au particles lose heat, the hydrogel coating absorbs water causing the reduced diameter to return to the resting diameter to decrease flow through the microfluidic conduit, wherein the nanoparticle composite acts as a valve within the microfluidic conduit to regulate fluid flow through the microfluidic conduit.

10. The microfluidic valve system of claim 9, wherein the activating device is configured to activate the nanoparticle composite causes irradiation of the nanoparticle composite with near infrared radiation.

11. The microfluidic valve system of claim 10, wherein the near infrared radiation has a wavelength of about 700 nm to about 1400 nm.

12. The microfluidic valve system of claim 10, wherein the activating device configured to deactivate the nanoparticle composite includes discontinuing irradiation of the nanoparticle composite with the near infrared radiation.

13. The microfluidic valve system of claim 9, further comprising a magnetic source disposed at a predetermined location along the microfluidic conduit to hold the nanoparticle composite at the predetermined location.

14. The microfluidic valve system of claim 9, wherein the microfluidic conduit comprises a seat sized to hold the nanoparticle composite, wherein the resting diameter of the nanoparticle composite is substantially the same as a diameter of the seat.

15. The microfluidic valve system of claim 9, wherein the microfluidic conduit is formed in an organic system.

16. The microfluidic valve system of claim 9, wherein the microfluidic conduit is formed in an inorganic system.

17. The microfluidic valve system of claim 9, wherein the microfluidic conduit is formed in an MEMS system.

18. A method for controlling a microfluidic valve system, the method comprising: providing a nanoparticle composite at a predetermined location of a microfluidic conduit, the nanoparticle composite comprising a core having a plurality of particles including magnetic particles and Au particles, each of which includes an exterior surface and is dispersed throughout a dielectric, the dielectric dispersed between the exterior surface of each of the plurality of particles, and a hydrogel coating surrounding the core wherein fluid flow is inhibited by the nanoparticle composite having a resting diameter that is substantially the same as a diameter of the microfluidic conduit at the predetermined location; activating the nanoparticle composite to heat the Au particles to cause the hydrogel coating to lose water content causing the diameter of the nanoparticle composite to decrease from the resting diameter to a reduced diameter that increases fluid flow through the microfluidic conduit; and deactivating the nanoparticle composite to cause the Au particles to lose heat such that the hydrogel coating absorbs water causing the reduced diameter to return to the resting diameter to decrease fluid flow through the microfluidic conduit, wherein the nanoparticle composite acts as a valve within the microfluidic conduit to regulate fluid flow through the microfluidic conduit.

19. The method of claim 18, wherein activating the nanoparticle composite comprises irradiating the nanoparticle composite with near infrared radiation.

20. The method of claim 19, wherein the near infrared radiation has a wavelength of about 700 nm to about 1400 nm.

21. The method of claim 18, wherein deactivating the nanoparticle composite comprises ceasing to irradiate the nanoparticle composite.

22. The method of claim 18, further comprising applying a magnetic source at a predetermined location along the microfluidic conduit to hold the nanoparticle composite at the predetermined location.

* * * * *

UNITED STATES PATENT AND TRADEMARK OFFICE
CERTIFICATE OF CORRECTION

| | | |
|---|---|---|
| PATENT NO. | : 8,499,792 B2 | Page 1 of 2 |
| APPLICATION NO. | : 12/540875 | |
| DATED | : August 6, 2013 | |
| INVENTOR(S) | : Lee | |

It is certified that error appears in the above-identified patent and that said Letters Patent is hereby corrected as shown below:

On the Title Page, in Item (56), under "FOREIGN PATENT DOCUMENTS", in Column 2, Line 1, delete "JP 200729249 9/2007".

On the Title Page, in Item (56), under "OTHER PUBLICATIONS", in Column 2, Lines 3-5, delete "Noritake Col, Limited "Ceramic Heater: Far-infrared Ceramic Heater" Online: http://www.noritake.co.jp/eng/eeg/heat/product/ensekigaisen/pdf/ceramicheat.pdf.".

On the Title Page, in Item (56), under "OTHER PUBLICATIONS", in Column 2, Line 6, delete "et al" and insert -- et al., --, therefor.

On the Title Page, in Item (56), under "OTHER PUBLICATIONS", in Column 2, Line 9, delete "et al" and insert -- et al., --, therefor.

On the Title Page, in Item (56), under "OTHER PUBLICATIONS", in Column 2, Line 11, delete "isopropylarcrylamide)" and insert -- isopropylacrylamide) --, therefor.

On the Title Page, in Item (56), under "OTHER PUBLICATIONS", in Column 2, Line 11, delete "Marcomolecules" and insert -- Macromolecules --, therefor.

On the Title Page, in Item (56), under "OTHER PUBLICATIONS", in Column 2, Line 13, delete "et al" and insert -- et al., --, therefor.

On the Title Page, in Item (56), under "OTHER PUBLICATIONS", in Column 2, Line 14, delete "et al" and insert -- et al., --, therefor.

On the Title Page, in Item (56), under "OTHER PUBLICATIONS", in Column 2, Line 17, delete "et al" and insert -- et al., --, therefor.

Signed and Sealed this
Twenty-second Day of April, 2014

Michelle K. Lee
*Deputy Director of the United States Patent and Trademark Office*

On Title Page 2, in Item (56), under "OTHER PUBLICATIONS", in Column 1, Line 1, delete "et al" and insert -- et al., --, therefor.

On Title Page 2, in Item (56), under "OTHER PUBLICATIONS", in Column 1, Line 7, delete "et al" and insert -- et al., --, therefor.

On Title Page 2, in Item (56), under "OTHER PUBLICATIONS", in Column 1, Line 10, delete "et al" and insert -- et al., --, therefor.

On Title Page 2, in Item (56), under "OTHER PUBLICATIONS", in Column 1, Line 20, delete "et al" and insert -- et al., --, therefor.

On Title Page 2, in Item (56), under "OTHER PUBLICATIONS", in Column 1, Line 23, delete "et al" and insert -- et al., --, therefor.

On Title Page 2, in Item (56), under "OTHER PUBLICATIONS", in Column 1, Line 26, delete "et al" and insert -- et al., --, therefor.

On Title Page 2, in Item (56), under "OTHER PUBLICATIONS", in Column 2, Line 1, delete "et al" and insert -- et al., --, therefor.

On Title Page 2, in Item (56), under "OTHER PUBLICATIONS", in Column 2, Line 4, delete "et al" and insert -- et al., --, therefor.

On Title Page 2, in Item (56), under "OTHER PUBLICATIONS", in Column 2, Line 7, delete "et al" and insert -- et al., --, therefor.

On Title Page 2, in Item (56), under "OTHER PUBLICATIONS", in Column 2, Line 11, delete "et al" and insert -- et al., --, therefor.

In the Specification

In Column 10, Line 62, delete "thereof" and insert -- thereof. --, therefor.

In the Claims

In Column 11, Lines 37-38, in Claim 4, delete "of combined......1,000 nm." and insert the same at Line 36, after "diameter", as a continuation line.

In Column 11, Lines 41-42, in Claim 5, delete "of combined......500 nm." and insert the same at Line 40, after "diameter", as a continuation line.